(12) United States Patent
Wojtalik et al.

(10) Patent No.: US 11,208,141 B2
(45) Date of Patent: Dec. 28, 2021

(54) GEARBOX ASSEMBLY FOR A VEHICLE

(71) Applicant: ZF Steering Systems Poland Sp. z.o.o., Czechowice-Dziedzice (PL)

(72) Inventors: Artur Wojtalik, Katowice (PL); Tomasz Seneta, Wilkowice (PL)

(73) Assignee: ZF Steering Systems Poland Sp. z.o.o.

( * ) Notice: Subject to any disclaimer, the term of this patent is extended or adjusted under 35 U.S.C. 154(b) by 0 days.

(21) Appl. No.: 17/082,780

(22) Filed: Oct. 28, 2020

(65) Prior Publication Data

US 2021/0122407 A1 Apr. 29, 2021

(30) Foreign Application Priority Data

Oct. 29, 2019 (EP) .................................. 19461596

(51) Int. Cl.
*B62D 5/04* (2006.01)
*F16H 1/16* (2006.01)
*F16J 15/06* (2006.01)
*F16H 57/039* (2012.01)
*B62D 3/04* (2006.01)
*F16H 57/029* (2012.01)

(52) U.S. Cl.
CPC ............. *B62D 5/0403* (2013.01); *B62D 3/04* (2013.01); *F16H 1/16* (2013.01); *F16H 57/029* (2013.01); *F16H 57/039* (2013.01); *F16J 15/06* (2013.01)

(58) Field of Classification Search
CPC ...... B62D 5/0403; B62D 5/0409; B62D 3/04; F16H 1/16; F16H 57/029; F16H 57/039; F16J 15/06
See application file for complete search history.

(56) References Cited

U.S. PATENT DOCUMENTS

2003/0160413 A1 8/2003 Kinme et al.

FOREIGN PATENT DOCUMENTS

EP 0630800 A1 12/1994
JP 2018083540 A 5/2018

OTHER PUBLICATIONS

UK Search Report for corresponding Application Serial No. GB2014095.0, dated Feb. 11, 2021, 1 page.

*Primary Examiner* — Thomas C Diaz
(74) *Attorney, Agent, or Firm* — Robert James Harwood

(57) ABSTRACT

A gearbox assembly including a housing, an output shaft, a wheel gear that is fixed to the output shaft, and an input shaft. A torsion bar that connects the input shaft to the output shaft, an electric motor, a worm gear that is rotationally fixed to the rotor and engages the wheel gear to transfer torque from the motor to the output shaft, and a key lock assembly. A seal assembly is provided that isolates the locking collar from the wheel.

4 Claims, 7 Drawing Sheets

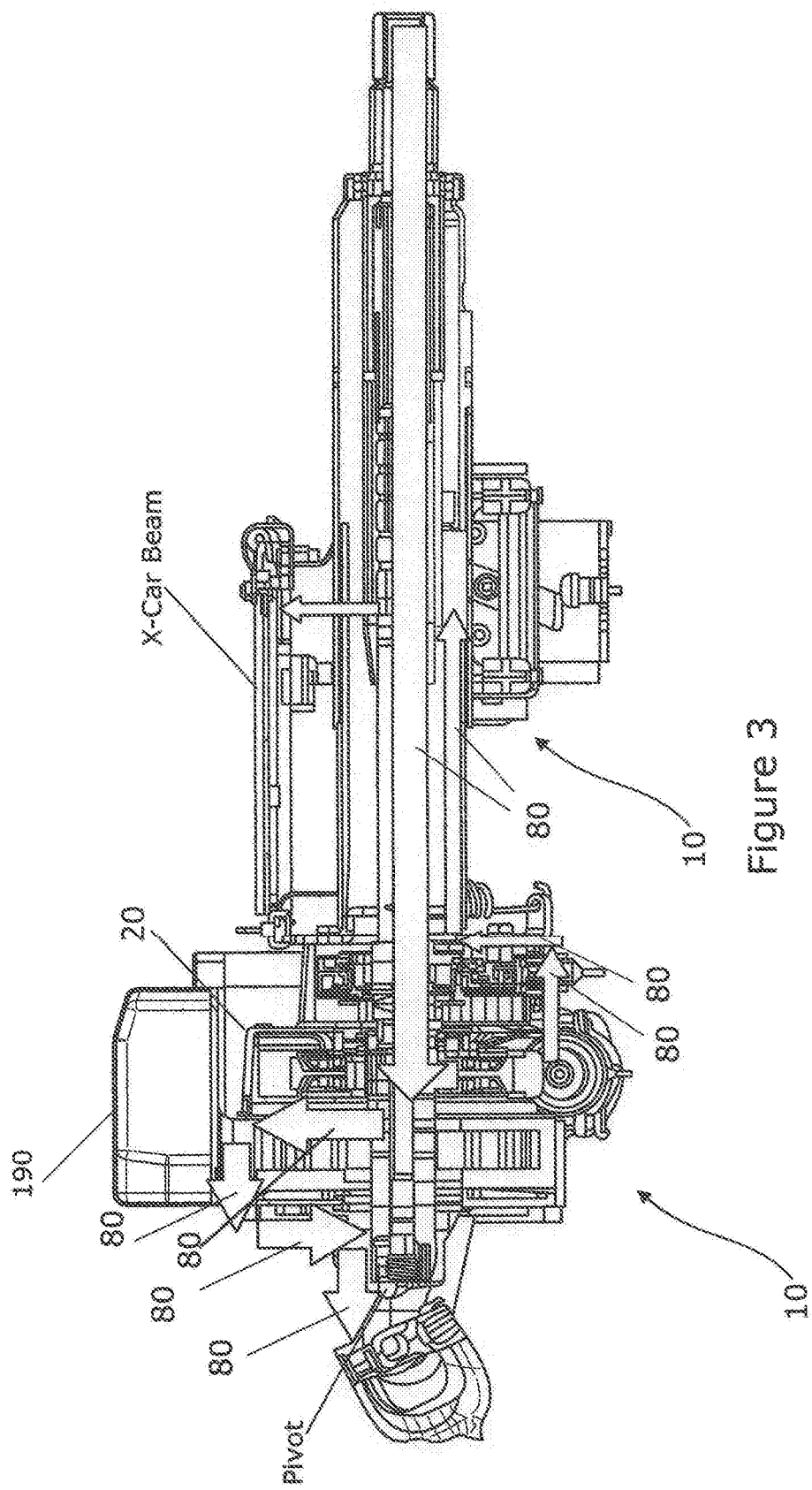

GEARBOX ASSEMBLY FOR A VEHICLE

CROSS-REFERENCE TO RELATED APPLICATION

This application claims priority to EP Patent Application No. 19461596.9 filed Oct. 29, 2019, the disclosure of which is incorporated herein by reference in its entirety.

TECHNICAL FIELD

This disclosure relates to improvements in gearbox assemblies, in particular to a gearbox assembly for use in an electric power steering assembly of a vehicle.

BACKGROUND

It is known to provide a gearbox assembly of the kind having a housing that locates and protects a worm and wheel gear assembly. The gear assembly comprises a first shaft assembly comprising a worm gear, in the form of a helical screw that extends along a length of the shaft, that is supported relative to the housing by at least one annular bearing assembly, and a second shaft assembly comprising carrying a wheel gear which is also supported relative to the housing by at least one bearing assembly. The two shafts are offset axially and are arranged perpendicular to each other so that teeth on the perimeter of the wheel gear engages with the worm of the worm gear. Rotation of the wheel gear will cause rotation of the worm gear and vice versa. This permits the transfer of torque between the two shafts. One shaft may define the input to the gearbox assembly and the other the output.

Worm and wheel gear assemblies are especially suitable for applications where a simple compact mechanism with a high gear ratio is required. Through the appropriate choice of gear tooth design a worm and wheel gear assembly can provide a low backlash in both transmission directions along with low friction. These are important characteristics in an electric power steering assembly where a motor applies an assistance torque through a gearbox to a part of a steering mechanism to help the driver to turn the steering wheel. Any backlash would give an undesirable feel to the driver through the steering wheel. The 90 degree offset between the input and output allows for a convenient positioning of a drive motor alongside a steering shaft.

The wheel gear of the gearbox assembly may be provided on section of hollow shaft that is connected inline between an input shaft of a steering assembly which support a handwheel and a flexible joint to the steering rack. In some arrangements the worm wheel may be secured to a hollow output shaft that is located within the gearbox and that connects to the flexible joint. Within this hollow shaft a torsion bar may be provided which interconnects the input shaft and the output shaft. The function of the torsion bar is to allow a large relative angular displacement between the input shaft and the output shaft as the driver applies a torque to the handwheel. This may be measured to determine the value of the torque, and a controller may then generate drive signals for the motor as a function of the measured torque. In general, the higher the measured torque the higher the demanded motor assistance to help the driver turn the handwheel.

To prevent theft of the vehicle, it is mandated in many countries to fit a key lock that engages a part of the steering assembly when locked and prevents the handwheel from being rotated. This typically acts on a locking ring that is fixed to the input shaft.

SUMMARY

The applicant has appreciated that it may be desirable to provide a key lock that is integral to the gearbox rather than acting on the input shaft.

According to a first the disclosure provides a gearbox assembly comprising: a housing, an output shaft, a wheel gear that is fixed to the output shaft, an input shaft, a torsion bar, an electric motor, a worm gear and a key lock. The torsion bar connects the input shaft to the output shaft. The worm gear may be rotationally fixed to the rotor and engages the wheel gear to transfer torque from the motor to the output shaft. The key lock includes an adapter having an annular inner part, a web, and an annular outer part. The annular inner part may be secured to the output shaft on the side of the gear wheel facing away from the input shaft. The annular outer part may have an outer part having a larger diameter than the inner part. A web may connect the inner part to the outer part. A locking collar may be supported by the outer part of the adapter. The key lock may be fixed to the housing and may be movable between an extended position in which a part of the key lock engages the lock collar and a retracted position in which the part is held clear of the locking collar.

A seal assembly may be provided which isolates the locking collar from the wheel gear. The seal assembly may comprise a radially extending collar which extends radially outward from the adapter such that an outer rim of the collar overlaps an inwardly protecting shoulder formed on the inside of the housing to form a seal between the key lock ring and the wheel gear. The shoulder that the rim of the baffle overlaps may be formed as a step between an enlarged interior portion of the housing and a reduced diameter interior portion. The collar and shoulder together provide a convoluted path between the locking collar and the wheel gear.

The collar may be secured to an outer part of the adapter by welding or any other suitable means. It may be secured to the web of the adapter, or to the inner part of the adapter. Alternatively, the collar may be fixed to the transfer ring, where provided. This may comprise a radial flange on one end of the transfer ring. This allows the collar and ring to be formed from one sheet of material.

The shoulder that the rim of the baffle overlaps may be formed as a step change in diameter between an enlarged interior portion of the housing and a reduced diameter interior portion. This defines an internal corner of the shoulder and an external corner when viewed in cross section. The outer rim of the baffle may be spaced a distance away from the axis of the outer shaft than the distance between the external corner of the shoulder is spaced from the axis so that as the baffle rotates it always overlaps the shoulder. The outer rim may have a constant radius, as may be shoulder, but as long as the overlap is maintained for all orientations of the baffle the outer rim need not be perfectly circular.

The step in diameter to form the shoulder is positioned so that the adapter and collar can be pushed onto the output shaft towards the wheel gear until the rim of the collar is adjacent but not contacting the shoulder. This forms a simple labyrinth types seal. The baffle and the web of the adapter may together form a continuous barrier to prevent the passage of oil or grease from the wheel gear to the key lock ring. The collar may comprise a solid baffle formed from a thin disk of material that is welded at an inner diameter onto the adapter. The baffle may be located in the housing so that it does not contact the housing.

In an alternative to a baffle forming a non-contact labyrinth type seal, a contact type seal may be provided between the adapter and the housing that isolates the locking collar from the wheel gear although this will introduce some friction into the assembly which may be undesirable. The contact seal may be secured to the adapter and slide over the housing or may be secured to the housing and slide over the adapter. In a preferred arrangement the collar may comprise a part of a tolerance ring that secures the lock collar to the adapter. The adapter may have an inner part that is provided with a set of splines that extend radially inwards towards the centre of the inner part that engage corresponding outwardly extending splines on the output shaft. The splines may be an interference fit.

The wheel gear may be fixed to the output shaft by splines on an inner diameter of the wheel gear that engages with corresponding splines on the output shaft. The outer diameter of the splines that support the wheel gear may be larger than the outer diameter of the splines that support the adapter. The outer diameter of the splines that support the adapter may be smaller than the inner diameter of the splines of the wheel gear. This allows the wheel gear to be pressed into position over the spines that support the adapter without any interference, followed by pressing the adapter into position. The adapter may be provided with at least one hole radially offset from the inner diameter of the transfer ring which permits a locking tool to be placed in the hole to prevent rotation of the tolerance ring when a torque is applied to the worm wheel. This allows for testing of the behaviour of the lock mechanism during assembly.

The locking collar may comprise a set of teeth spaced circumferentially around the outer part of the adapter, the spacing between adjacent teeth defining recesses that receive the part of the key lock when the key lock is in the extended position. The locking collar and the adapter may be formed as one component.

In an alternative a torque transfer ring, or tolerance ring, may be located between the adapter and the locking collar which prevents relative rotation of the locking collar and transfer ring up to a defined torque load limit after which rotation occurs. This arrangement prevents overtorque damaging the assembly whilst still making it impossible to freely steer the vehicle.

The torque transfer ring may comprise an annular support that fits concentrically around the outer part of the adapter and a plurality of raised contact portions that extend radially outward from the support to engage an annular inner face of the locking collar. These raised portion may be lozenge shaped.

The outer part of the adapter may comprise a cylinder and the web of the adapter may comprise an annular end wall of the cylinder. The inner part of the adapter may also comprise a cylinder that is secured at one end to the end wall and is concentrically located inside the outer cylinder.

The assembly may be arranged such that it may be assembled in the following order: (1) inserting the input shaft and output shaft as one assembly into the housing from one side; (2) pressing the wheel gear onto the output shaft from the opposite side of the housing; (3) pressing the adapter onto the output shaft.

The method of assembly may further include the step of securing the locking ring and the transfer ring onto the adapter prior to fixing the adapter to the output shaft. The method may include testing the preassembled lock ring, transfer ring and adapter prior to fitment to ensure it complies with a national or manufacturer specified theft resistance standard by applying torque across the assembly.

BRIEF DESCRIPTION OF THE DRAWINGS

There will now be described, by way of example only, one embodiment of the present disclosure with reference to and as illustrated in the accompanying drawings of which:

FIG. 3 shows the torsional load path through the gearbox assembly when the key lock is engaged;

DETAILED DESCRIPTION

Figure 1:
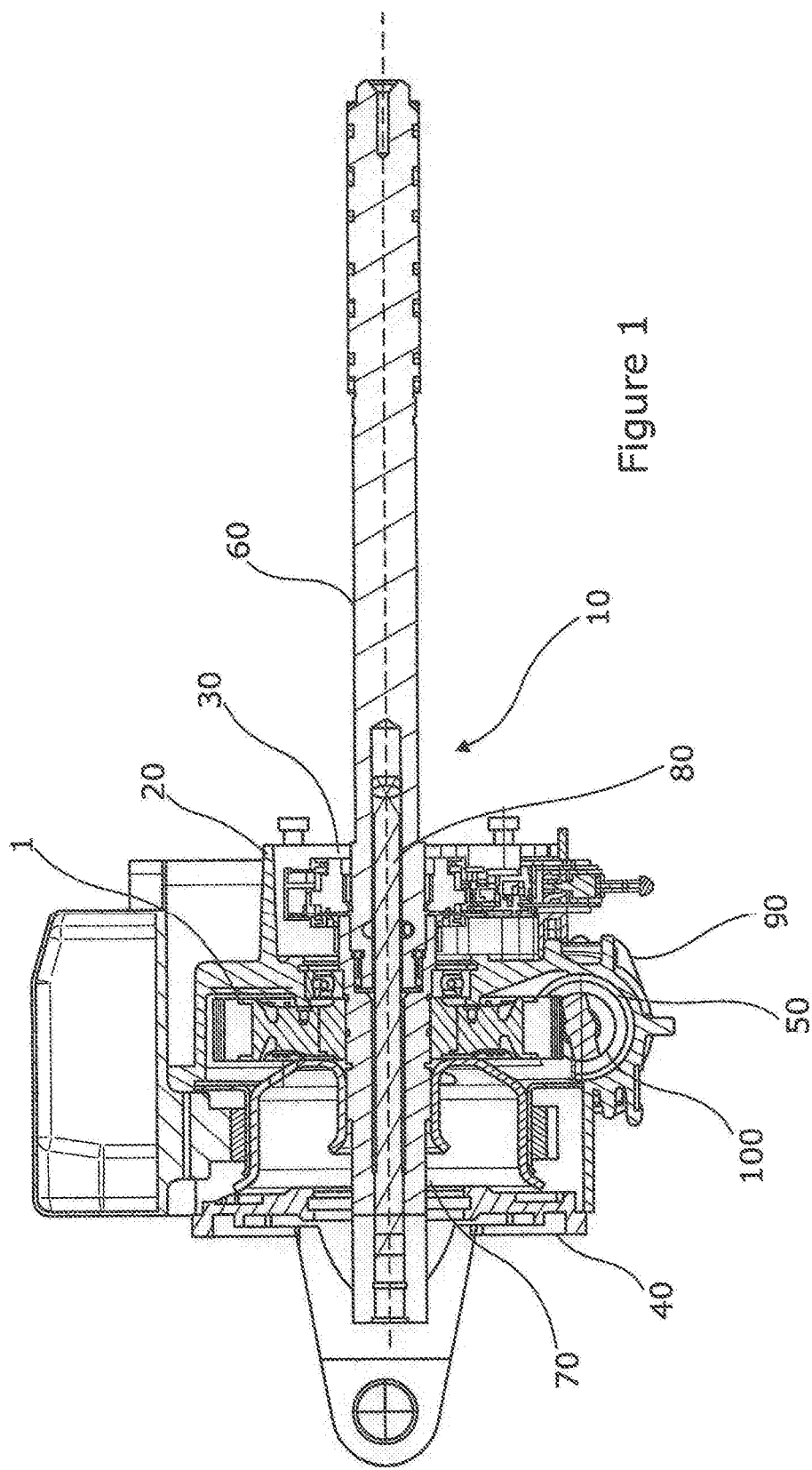
FIG. 1 is a cross sectional view of an embodiment of a gearbox assembly in accordance with the present disclosure.

As shown in FIGS. 1 to 7, a gearbox assembly 10 comprises a housing 20 having three open ports, two ports 30, 40 of which are in axially in line on opposing ends of the gearbox housing 20 and one port 50 is offset from and orthogonal to the axis connecting the two inline openings. One of the ports 30 receives an end portion of an input shaft 60 that has a set of splines at its opposite end for receiving a hub of a steering wheel. This shaft may be telescopic and is supported inside a steering column shroud (not shown) by bearings (also not shown) so that it can rotate as the steering wheel is rotated.

The other inline port 40 receives an end portion of an output shaft 70. The two facing ends of the input shaft 60 and output shaft 70 that are located within the gearbox housing 20 are connected by a torsion bar 80. The function of the bar 80 is to allow angular movement between the input and output shaft 60, 70 when a torque is applied across the torsion bar 80.

The third open port 50 of the housing 20 receives an output shaft 70 of an electric motor 90. The body of the motor 90 is secured to the housing 20. The rotor carries a worm gear 100.

Figure 2:
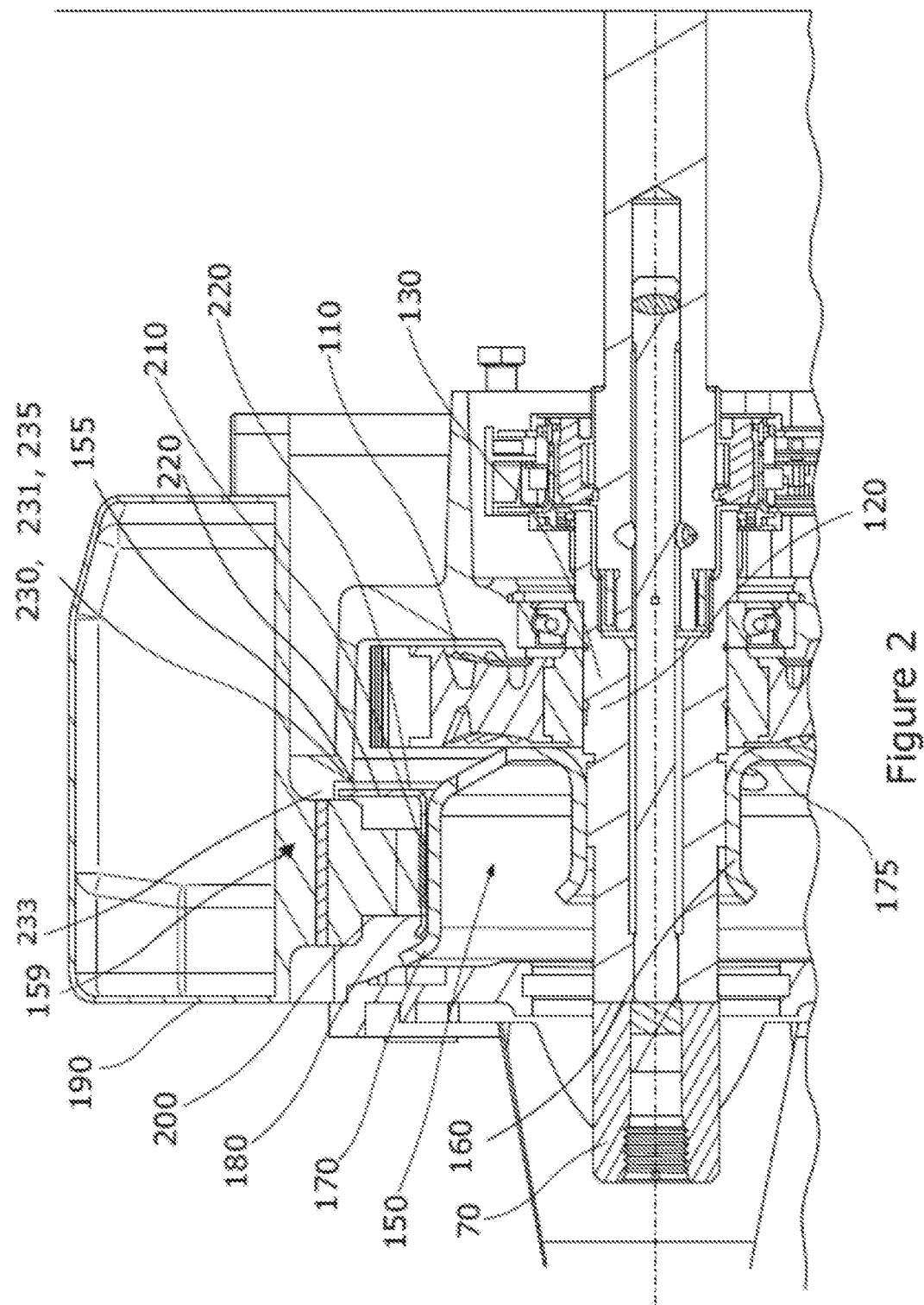
FIG. 2 is an enlarged cross sectional view of a part of the gearbox assembly of FIG. 1.

As best seen in FIG. 2, the output shaft 70 carries a wheel gear 110 and the worm gear 100 meshes with the wheel gear 110. In use, the twisting of the torsion bar 80 when a torque is applied is detected by a torque sensor (not shown) and the output of the torque sensor is fed to a controller. This generates a drive signal that causes the motor 90 to apply a demanded assistance torque to the output shaft 70 through the worm and wheel gear 100, 110. This assistance torque helps the driver to turn the steering wheel by providing a degree of assistance.

The wheel gear 110 is provided with a set of internal splines 120 that mesh with a corresponding set of circumferentially spaced splines 120 on the output shaft 70.

Figure 5:
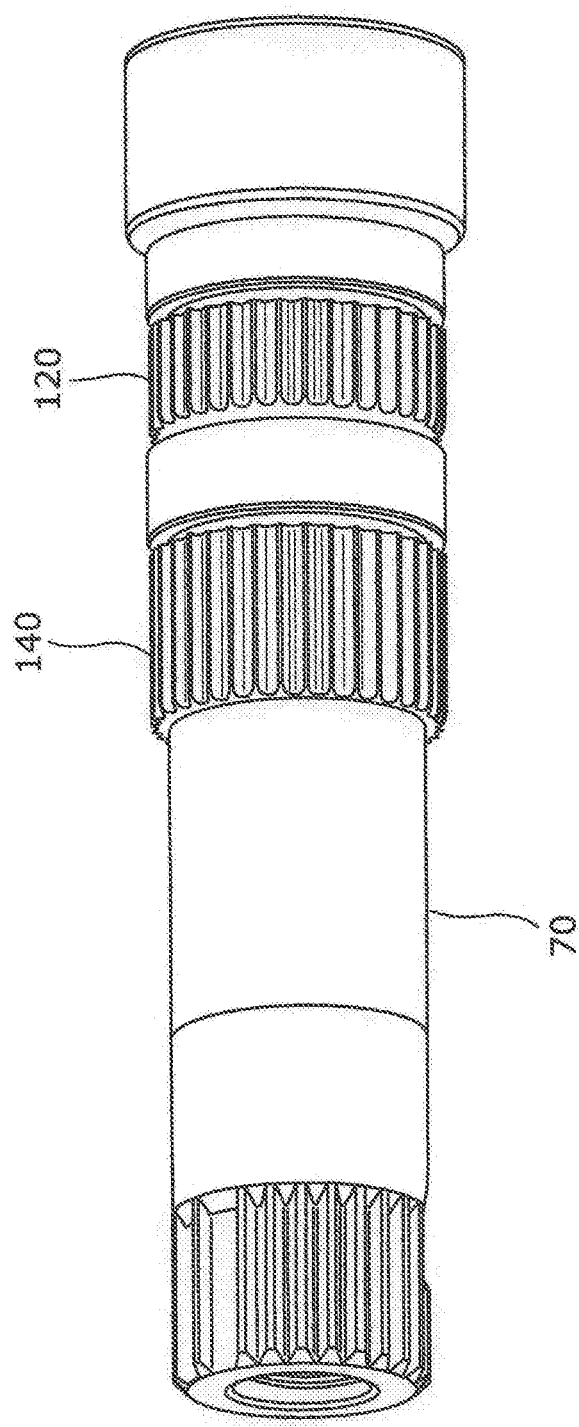
FIG. 5 is a detailed view of the output shaft with all other parts removed for clarity.

The output shaft 70 also carries a second set of circumferentially spaced splines 140. These splines 140 are located between the wheel gear 110 and the end of the output shaft 70 that protrudes from the gearbox housing 20. FIG. 5 shows the two sets of splines 120, 140 on the output shaft 70 and as best seen in FIG. 6(a) and (b) the diameter D1 of the splines 120 that support the wheel gear 110 is D1 which is larger than the diameter D2 of the splines 140 that support the adapter 150. This allows the wheel gear 110 to easily be threaded over the second set of splines 140 without any interference during assembly.

The second set of splines 140 on the output shaft 70 mesh with corresponding splines on an adapter 150. The adapter 150 has a cylindrical inner part 160 that is provided with splines that mesh with the second set of splines 140 on the output shaft 70.

The adapter 150 also has a cylindrical outer part 170, of larger diameter than the inner part, and a web 175 that connects the inner part to the outer part 170. The inner part 160, web 175 and outer part 170 may be formed by pressing a single sheet of metal or may be molded or cast of formed using an additive manufacturing technique as a single piece.

The outer part 170 of the adapter 150 supports a locking collar 180. This comprises a ring of teeth 181 that are spaced circumferentially around a support ring 183. This is best seen in FIG. 4.

A fourth opening in the gearbox housing 20 is provided in a region that faces the locking collar 180 and a key lock 190 is fixed to the housing 20 so that a movable locking part 200 faces the locking collar 180. The key lock 190 is movable between an extended position in which the locking part of the key lock 190 engages the locking collar 180 and a retracted position in which the part is held clear of the locking collar 180. When engaged the movable part enters a space formed between adjacent teeth 181 of the locking collar 180, As shown this movement is in a radial direction relative to the axis of rotation of the output shaft 70.

In the example shown, the inner diameter of the locking collar 180 is larger than the outer diameter of the outer part 170 of the adapter 150 and an optional tolerance ring 210 is provided in the gap formed between the adapter outer part 170 and the locking collar 180. The three parts—outer part 170, tolerance ring 210 and locking collar 180 are therefore arranged concentrically. The tolerance ring 210 comprises an annular band 211 that has a plurality of lozenge shaped raised contact elements 235 on an outer face 237 that engage the locking collar 180. These can be seen in FIG. 4. The tolerance ring 210 in use prevents relative rotational movement of the adapter 150 and locking collar 180 up to a predetermined torque limit, whereafter it will allow slip. This feature enables the steering input shaft 60 to be forced around if sufficient torque is applied without causing any permanent damage even when the key lock 190 is engaged.

Figure 4C:
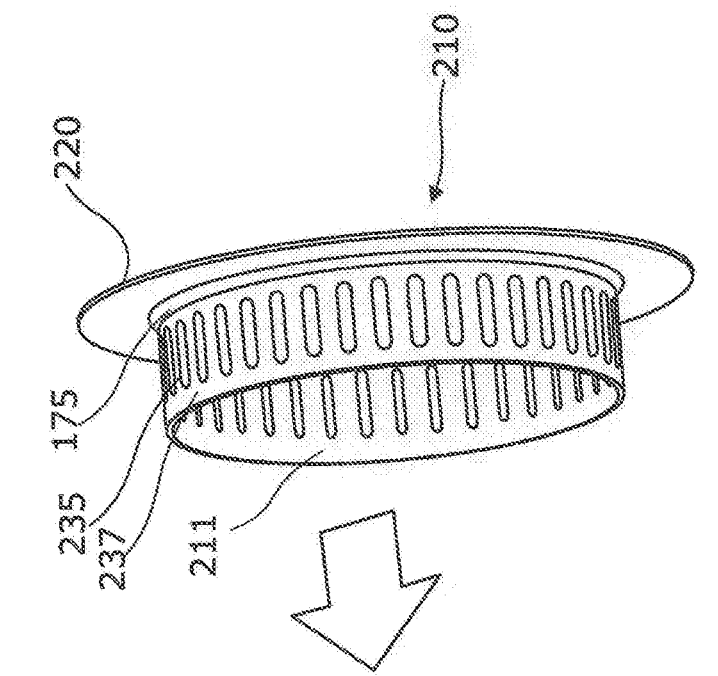
FIG. 4(c) shows the tolerance ring before the locking collar is assembled onto the tolerance ring.
Figure 4B:
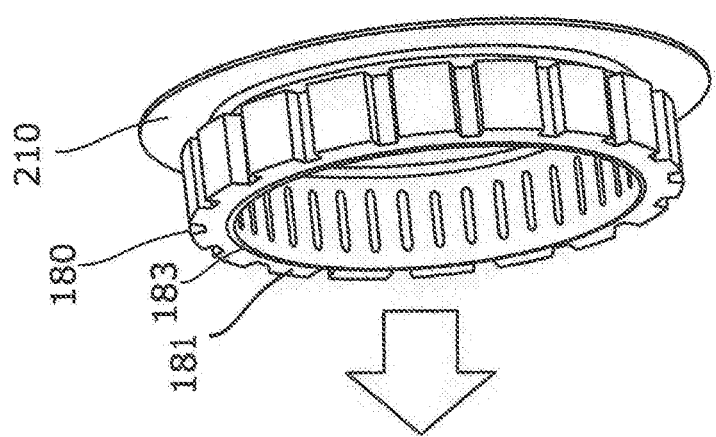
FIG. 4(b) shows the tolerance ring and locking collar assembled together.
Figure 4A:
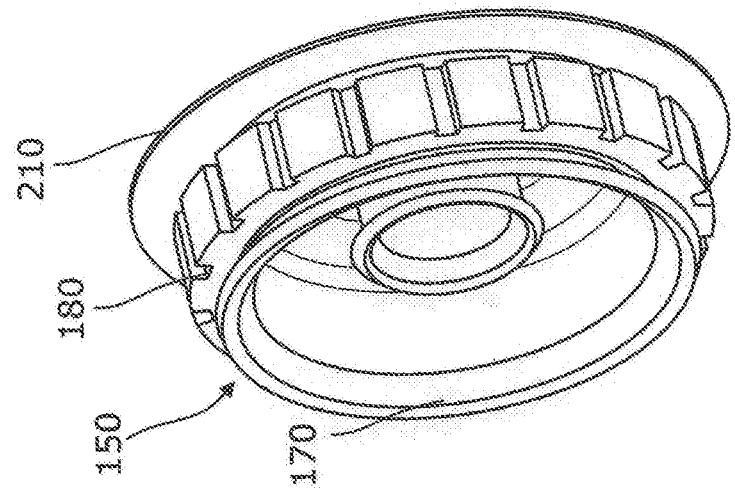
FIG. 4(a) shows the outer part, tolerance ring and locking collar assembled together.

Also best seen in FIG. 2 and FIG. 4 a baffle 220 or collar 220 is provided that comprises a disk shaped member that is formed by a lip on an end of the tolerance ring 210. This baffle 220 has an outer rim 221 that extends outwards to overlap a shoulder 230 formed on the inside of the housing 20. The shoulder 230 faces the open end of the gearbox housing 20 that the output shaft 70 protrudes through. The baffle 220 and the web 175 of the adapter 150 provides a continuous wall that eliminates any direct path for oil or grease to move from the wheel gear 110 onto the surface of the locking collar 180. The only path is the indirect path around the shoulder 230 and rim 221 of the baffle 220.

Therefore, a seal assembly 159 is provided that isolates the locking collar 180 from the wheel gear 110. The seal assembly includes a radially extending collar or baffle portion 220 of the adapter 150 wherein the baffle portion extends radially outward from the adapter 150 such that an outer rim 155 of the baffle 220 overlaps an inwardly protecting shoulder 230 formed on the inside of the housing 20 to form a seal between the locking collar 180 and the wheel gear 110. The shoulder 230 that the rim of the adapter 150 overlaps is formed as a step 231 between an enlarged interior portion 233 of the housing and a reduced diameter interior portion 235.

The gearbox assembly 10 shown is simple to assemble and also enables the adapter 150, tolerance ring 210 and locking collar 180 to be preassembled and to be tested to see if it provides a correct and repeatable performance when under torsional loads.

A suitable assembly sequence is as follows.

Step 1: The input shaft 60 and torsion bar 80 is inserted into the gearbox housing 20

Step 2: The output shaft 70 is pressed onto the torsion bar 80 until it reaches a limit stop. It may then be withdrawn slightly by inserted a release tool into a threaded bore in the free end of the output shaft 70 until the correct axial alignment of the input and output shafts 60, 70 is achieved.

Step 3: The adapter 150, tolerance ring 210 and locking collar 180 are assembled. This is shown in FIG. 4. They may also be tested at this stage.

Figure 6:
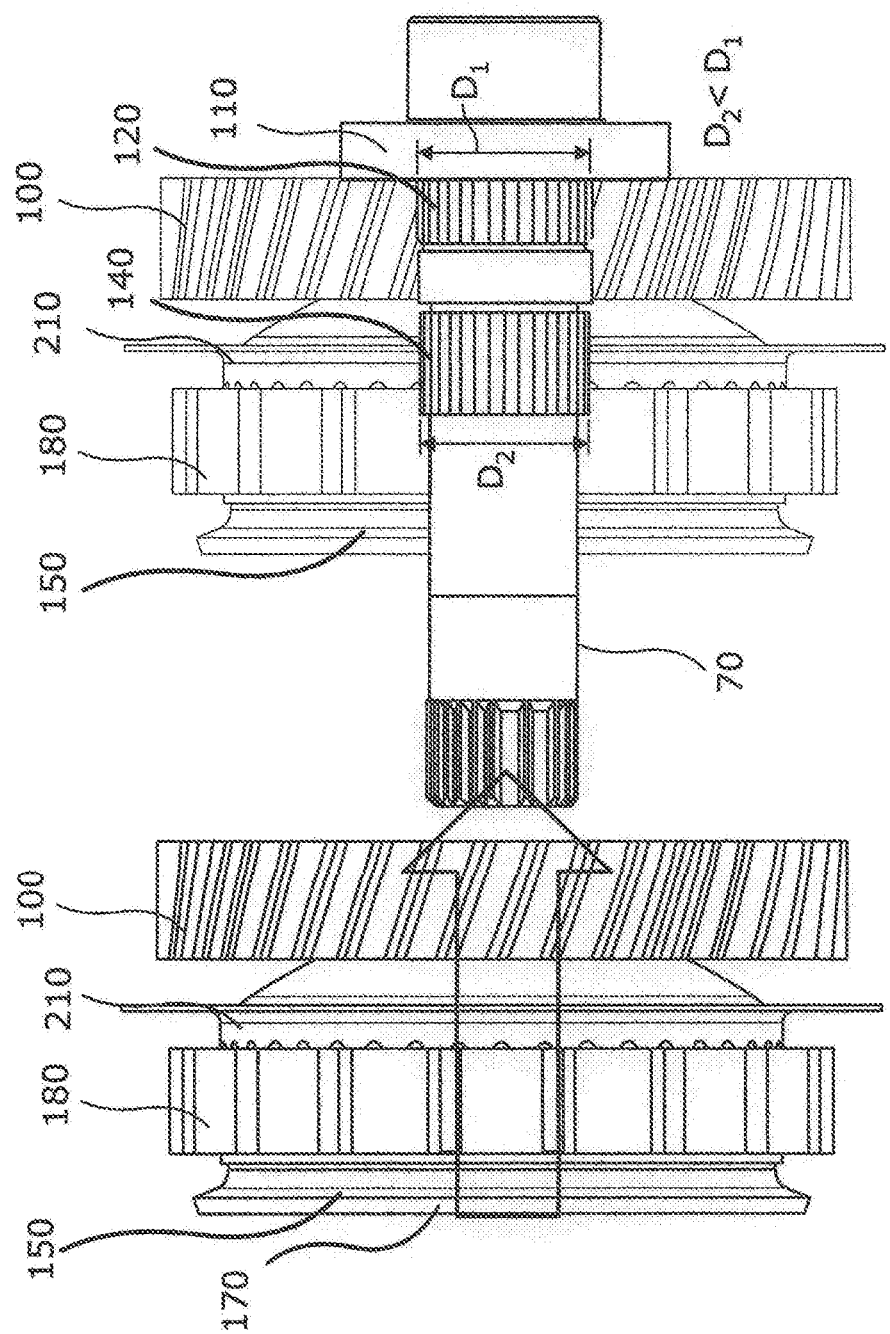
FIG. 6(a) shows the wheel gear and adapter prior to being assembled onto the output shaft.
FIG. 6(b) shows the wheel gear and adapter being pressed onto the output shaft.
Figure 7:
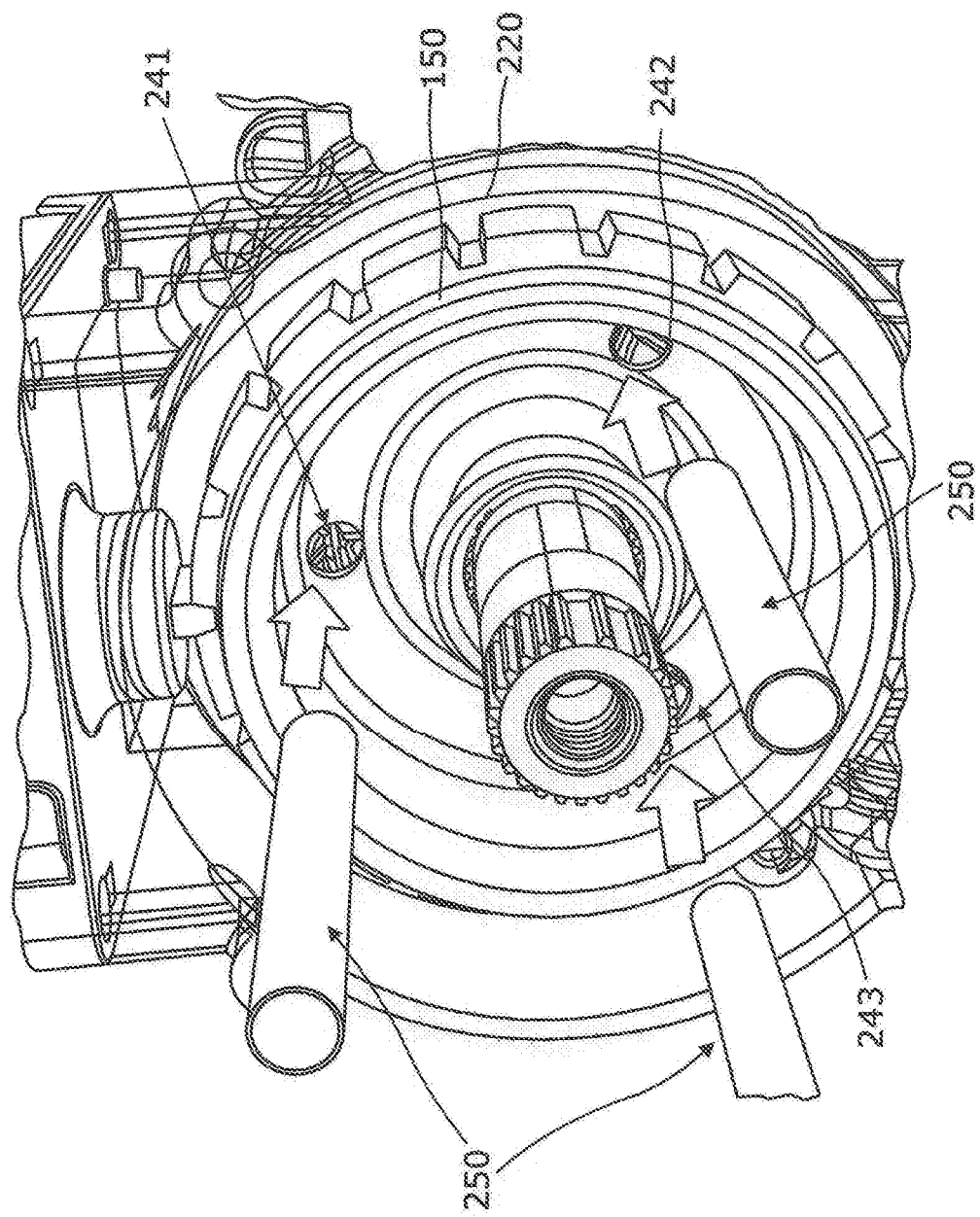
FIG. 7 is a perspective view of the assembly looking in through an open end of the gearbox housing at the adapter and output shaft.

Step 4—The wheel gear 110 is pressed onto the first set of splines 120 on the output shaft 70. This is shown in FIG. 6.

Step 5: The adapter 150 is pressed onto the second set of splines 140 until an end stop is reached which sets the rim of the baffle 220 overlapping but not contacting the shoulder 230 in the housing 20. This is also shown in FIG. 6.

Step 6: The key lock 190 is fixed to the gearbox housing 20 and the motor 90 and worm gear 100 and located.

Once assembled further testing may be performed on the anti-theft performance of the assembly. To assist this testing the adapter 150 is provided with three holes 241, 242, 243 in the web 175 that may receive locking pins 250 of a lock tool which prevent the web 175 from rotating or allow the web 175 to force around whilst other parts of the assembly, such as the input shaft 60, wormshaft or key lock 190, are fixed in place. Of course, there may be as few as one hole or any other number, and rather than holes some other engagement feature may be provided that allows the adapter 150 to be held so it cannot rotate.

A method of assembly may comprise securing the locking collar 180 and the transfer ring (or tolerance ring) 210 onto the adapter 150 prior to fixing the adapter 150 to the output shaft 70.

The method may include testing the preassembled locking collar 180, transfer ring (or tolerance ring) 210, and adapter 150 prior to fitment to ensure it complies with a national or manufacturer specified theft resistance standard by applying torque across the assembly. FIG. 3 shows with block arrows the key load path through the steering shaft and key lock 190 onto the gearbox housing 20 where it is then transferred to a fix part of the vehicle.

What is claimed is:

1. A gearbox assembly comprising:
   a housing,
   an output shaft,
   a wheel gear that is fixed to the output shaft,
   an input shaft;
   a torsion bar that connects the input shaft to the output shaft;
   an electric motor;
   a worm gear that is rotationally fixed to the rotor and engages the wheel gear to transfer torque from the motor to the output shaft; and
   a key lock assembly further comprising:
      an adapter having an annular inner part that is secured to the output shaft on the side of the wheel gear facing away from the input shaft;
      an annular outer part, the outer part having a larger diameter than the inner part,
      a web that connects the inner part to the outer part, and
      a locking collar supported by the outer part of the adapter, and
      a key lock that is fixed to the housing and is movable between an extended position in which a part of the key lock engages the lock collar and a retracted position in which the part is held clear of the locking collar;
   wherein a seal assembly is provided adjacent to the housing which isolates the locking collar from the wheel gear.

2. A gearbox assembly according to claim 1 wherein the seal assembly comprises a radially extending baffle portion which extends radially outward from the adapter such that an outer rim of the baffle portion overlaps an inwardly protecting shoulder formed on the inside of the housing to form a seal between the locking collar and the wheel gear.

3. A gearbox assembly according to claim 2 wherein the shoulder that the rim of the baffle overlaps is formed as a step between an enlarged interior portion of the housing and a reduced diameter interior portion.

4. A gearbox assembly according to claim 3 wherein the collar comprises a part of a tolerance ring that secures the lock collar to the adapter.

* * * * *